L. W. ANDERSEN.
GAS, ELECTRIC, AND COMBINATION FIXTURE.
APPLICATION FILED JULY 31, 1909.
965,841.
Patented July 26, 1910.
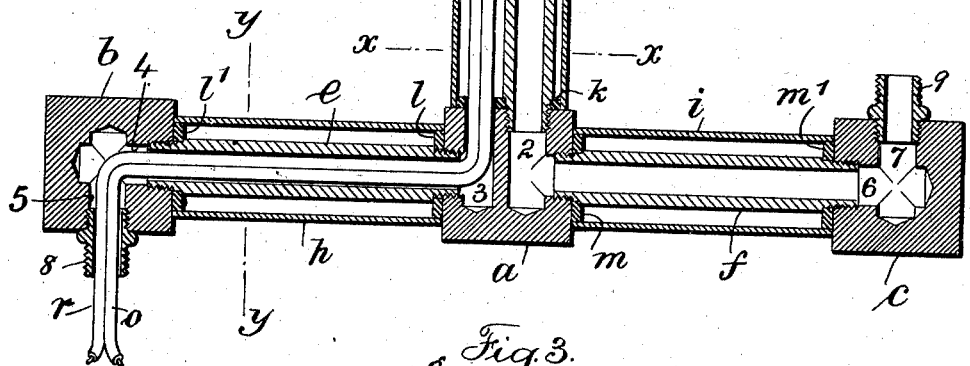
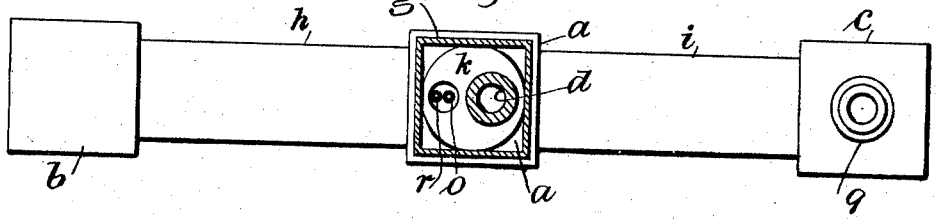
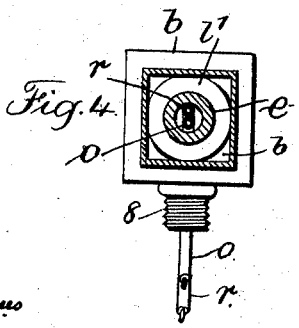
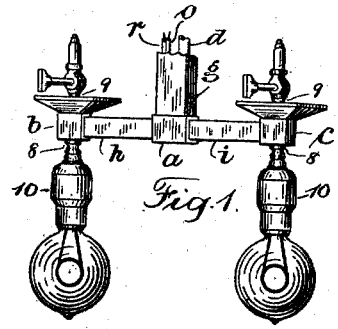
Witnesses
Chas H Smith
A. H. Serrell
Inventor
Lauritz W. Andersen.
by Harold Serrell
his atty.

UNITED STATES PATENT OFFICE.

LAURITZ W. ANDERSEN, OF WATERBURY, CONNECTICUT, ASSIGNOR TO THE PLUME & ATWOOD MANUFACTURING CO., OF WATERBURY, CONNECTICUT, A CORPORATION OF CONNECTICUT.

GAS, ELECTRIC, AND COMBINATION FIXTURE.

965,841. Specification of Letters Patent. Patented July 26, 1910.

Application filed July 31, 1909. Serial No. 510,526.

*To all whom it may concern:*

Be it known that I, LAURITZ W. ANDERSEN, a citizen of the United States, residing at Waterbury, in the county of New Haven and State of Connecticut, have invented an Improvement in Gas, Electric, and Combination Fixtures, of which the following is a specification.

In the art of gas, electric or combination fixtures, it has heretofore been common to make a union junction or head block of a cube of brass upon one or more faces of which is turned a raised portion of circular outline; the holes for the gas being made in through this block and through these end portions from opposite sides and the holes for the electric wires being also made in through this block from opposite and other directions; the purpose of the raised portion or portions with circular outline being seats for the tubes of the fixture which simultaneously surround the gas pipe and the wires and impart a finishing contour to the fixture. These blocks with the turned raised portion or portions on the faces thereof are difficult and expensive to manufacture and add materially to the cost of the fixture, and the object of my invention is to simplify the construction and lessen the cost.

In carrying out my invention, the block or union between the parts of the fixture is a cube of brass or other suitable metal with holes either for gas or electric circuit wires, or both, made into adjacent faces at right angles to one another. I employ perforated washers or disks adapted to lie centrally upon one or more faces of the block which are held in place by tubes either for gas or for connecting similar parts in forming up the fixture and which parts pass through the perforations of the disks and screw into the block; the force of the union mainly holding the disks in place. These disks center the finishing tube of the gas fixture or electrolier, the ends of which snugly surround the disks. The blocks clamped and held together by the pipe sections screwing thereinto serve to clamp the finishing tube in position, all of which is hereinafter more particularly set forth.

In the drawing, Figure 1 is an elevation in small size representing a fixture made according to my invention. Fig. 2 is a vertical section representing a form of my improvement. Fig. 3 is a sectional plan at the dotted line $x$, $x$, of Fig. 2. Fig. 4 is a cross section at the dotted line $y$, $y$, Fig. 2, and Figs. 5 and 6 illustrate spacing disks of other outlines.

Referring particularly to Figs. 2 to 4 inclusive, $a$ $b$ and $c$ represent the junction and end blocks. These are preferably cubes of brass or other suitable metal in which are formed holes that are at right angles to one another meeting within the block. These holes may be formed in a common surface for gas and electric circuit wires and in the adjacent surfaces at right angles thereto for gas on one side and electric circuit wires on the other.

$d$ $e$ and $f$ are pipe sections and $g$ $h$ and $i$ finishing tubes of the fixture.

$k$ $l$ $l^1$ $m$ and $m^1$ represent the disks preferably circular and comparatively thin and adapted to lie against any face of the cube of metal and to coincide with whatever holes may be provided in the cube of metal. For instance, the cube $a$ at the center of the fixture is provided on one side with the opening 2 from the upper surface of the cube down and with an opening from the right hand surface of the cube in, and the said cube is also provided in the opposite side with an opening 3 from the top down and an opening from the left hand side in, and these openings being made at right angles to one another intersect so as to form a complete opening through the block.

The disk $k$ is adapted to lie upon the upper surface of the block $a$ and the pipe section $d$ passes through an opening in the disk $k$ and screws into the metal cube $a$ at the mouth of the opening 2 and the opening in the right hand vertical face of the cube is also interiorly threaded for the pipe section $f$ and this passes through a hole in the center of the disk $m$ and screws into the block; the screwing of these pipe sections into the block after passing them through the disks $k$ and $m$ serves to hold said disks firmly in position. The centering disk $k$ is made with two openings; the second opening coincides with the opening 3 down into the cube $a$ and through this opening the electric circuit wires $o$ $r$ are passed and these wires may bend in the opening 3 and pass out of the block horizontally.

The pipe section $e$ passes through the central opening of the disk $l$ and screws into the opening of the block $a$ and before so doing this pipe section is threaded over the circuit wires and forms a receiver therefor, and when screwed down tightly to place the pipe sections $e\ f$ extending in opposite directions from the central junction block $a$ form oppositely disposed foundation arms for the fixture.

The disk $k$ comes centrally of the upper surface of the block $a$ and is held in place, as described, by the pipe section $d$ and the circuit wires $o\ r$, and this disk $k$ forms a centering device for the finishing tube $g$ which extends around the pipe section $d$ and the wires $o\ r$ and around the disk $k$; its exterior on opposite sides bearing an exact relation to the opposite surfaces of the cube $a$.

The end blocks $b$ and $c$ are cubes advantageously of the same size as the cube or block $a$. Each of these blocks is provided with holes from opposite surfaces at right angles to one another and which meet in the center of the block; the block $b$ having the holes 4 and 5 and the block $c$ the holes 6 and 7.

The respective ends of the pipe sections $e\ f$ are threaded and at one end are passed through the disks $l$ and $m$ and screwed into the interiorly threaded openings of the block $a$. Then after said pipe sections have been passed through the disks $l^1$ and $m^1$ and after the finishing tubes $h$ and $i$ have also been passed over said pipe sections and away and the wires $r\ o$ passed through the block $b$, the act of connecting the end blocks $b\ c$ to the tube sections $e\ f$ not only increases the extent of finish of the fixture but serves to clamp the finishing tubes $h$ and $i$ in position with their ends in contact both with the center block $a$ and the end blocks $b\ c$.

The circuit wires $o\ r$ extend through the openings 4 5 of the block $d$ and I prefer also to pass these wires through the electric fixture sleeve 8 which is screwed into the opening 5 and is adapted in turn to have secured to it the socket 10 of a light bulb shown in the illustration Fig. 1; the block $c$ at the right hand of Fig. 2 having the openings 6 7 at right angles to one another provides for the passage of the gas from the pipe section $d$ through the block $a$ and through the pipe section $f$, and this block $c$ is preferably provided as shown with a gas sleeve 9 to which a burner such as shown in Fig. 1 is applied above the block.

I do not limit myself in my invention to a head block with two sets of openings such as the block $a$, nor to the head block with one set of openings such as the end blocks $b\ c$; my invention relating especially to either form of block with the separate and removable disk members such as $k\ l\ l^1\ m$ and $m^1$. In fact in the illustration Fig. 1 there are two gas burners and two electric socket and bulb devices employed with the electrolier, consequently the end blocks of such a fixture will necessarily be made like the block $a$ in Fig. 2 and the center block will also be made of corresponding form but in position horizontally instead of vertically with regard to the respective openings and of increased size. The separate disks are to fit snugly within the finishing tubes at the end so that these tubes are centered exactly with reference to either face of the block and these centering disks are to be provided with central holes as shown at the end blocks Fig. 2, or with two holes as shown at the center block Fig. 2.

In making these centering disks separate from the blocks great saving in time of manufacture and in the cost of manufacture of these articles is effected, for the blocks should be perfect cubes or substantially so and the surfaces are finished complete or polished as desired; the disks then lying flat against the faces of the block and coming within the ends of the finishing tubes do not require the same finish as do the surfaces of the blocks, and the disks are interchangeable and of the same size and are preferably cut from a bar previously bored either with a center hole or with two holes as shown with reference to the block $a$.

While I have shown in Figs. 2, 3 and 4, the spacing disks as round in outline or configuration, I do not limit myself in this particular, as these spacing disks may be square as shown in Fig. 5, hexagonal as shown in Fig. 6, or of any other desired outline or configuration agreeing with the cross sectional shape of the finishing tube of the fixture which they are employed to enter and center with reference to the block.

I claim as my invention:—

1. In a fixture the combination with supporting and connecting members or pipes, of a block having openings in adjacent right angled faces which meet and open up communication through the block and into which openings the members or pipes may be securely fastened, and a centering disk apertured for the pipe and through which the same passes to connection with the block and said disk providing a shoulder for centering and supporting the finishing member of the fixture.

2. The combination in a fixture with a central union or end block and the finishing tubes of the fixture, of one or more separate metal disks adapted to fit within the ends of the finishing tube and center the same and to lie against the surfaces of the said blocks, said centering disks being held in position by the respective ends of the connecting members or pipes passing through the same into said blocks.

3. In a fixture the combination with supporting and connecting members or pipes, of a junction block in the form of a cube of metal having adjacent holes made into the block from one surface and opposite holes made into the block in opposite faces at right angles to the former face and the holes intersecting and opening up communication with the first aforesaid holes, and centering disks provided with openings and adapted to lie upon the surfaces of said junction block and to receive the connecting members or pipes passed through the same into the block, the same serving as a passageway for gas and electric circuit wires and said disks providing shoulders for centering and supporting the finishing members of the fixture.

Signed by me this 24th day of July 1909.

LAURITZ W. ANDERSEN.

Witnesses:
J. L. SCOTT,
A. J. STORZ.